United States Patent Office 3,770,712
Patented Nov. 6, 1973

3,770,712
SLURRY PROCESS FOR PRODUCING STYRENE HOMOPOLYMERS AND BLOCK POLYMERS THEREOF USING ANIONIC CATALYSTS
Frederick C. Schwab, Metuchen, N.J., assignor to Mobil Oil Corporation
No Drawing. Filed May 12, 1971, Ser. No. 142,821
Int. Cl. C08f 1/09
U.S. Cl. 260—93.5    10 Claims

ABSTRACT OF THE DISCLOSURE

There is provided a slurry process for the polymerization of a non-polar styrene monomer, using an anionic catalyst initiator, a praffinic or monolefinic hydrocarbon slurrying medium, using an AB or ABA block polymer as dispersant, wherein the A monomer is styrene and the B monomer is a substituted styrene whose homopolymer is glassy at room temperature. The process is characterized by fast reaction times and easy removal of high quality crystal polystyrene polymer, which polymer is not soluble in the slurrying medium. There is also provided the continuance of the initial slurry polymerization with a second monomer, polymerizable with anionic catalysts, to produce block polymers. In the case wherein the slurrying agent is a volatile hydrocarbon, the product obtained will contain absorbed slurrying medium and, thus, be a foamable product.

BACKGROUND OF THE INVENTION

Field of the invention

This invention is concerned with anionic catalyzed slurry polymerization of styrene.

Description of the prior art

As is well known to those skilled in the art, most crystal polystyrene manufactured today is produced by free radical initiation in batch or continuous process. Major disadvantages of these methods are that they are slow, i.e., long reaction times give products high in oligomers and residual monomer. In accordance with the present invention, these disadvantages are overcome by the use of anionic polymerization techniques that produce pure products at very high conversion rates.

Although several patent references have disclosed certain features of the present process, none have suggested the combination of factors which lead to the process of this invention. For example, in U.S. Pat. No. 3,041,312 there is disclosed an anionic polymerization process that is carried out in a solvent which dissolves the polymer. In such a process, product recovery must be made by separating as by distillation or by precipitating product using large amounts of alcohol. In U.S. Pat. No. 3,095,-388 there is disclosed the polymerization of acrylic monomers to produce stable dispersions of the polymers in organic liquid. Such dispersions are produced by using block or graft copolymers in which one constituent is a rubber. In this process the rubber portion of the block polymer is soluble in the organic dispersing medium and the other constituent is insoluble in the organic dispersing medium but compatible with the polymer being formed. This process involves the use of peroxide catalysts and relatively long reaction times. British Pat. No. 893,429 discloses a dispersion polymerization using a lyophilic colloid and a peroxy catalyst. In the case of styrene the dispersing medium is an alcohol. Other patents which disclose a dispersing agent partly soluble in the organic liquid and partly soluble in the polymer, but using long term runs are set forth in British Pats. Nos. 1,007,476 and 1,008,188.

SUMMARY OF THE INVENTION

This invention provides a rapid process for polymerizing a styrene monomer dispersed in a paraffinic or monoolefinic hydrocarbon slurrying medium and using an anionic catalyst and a block polymer dispersing medium that is a glassy polymer at room temperature, having a glass transition temperature greater than 50° C.

The invention also provides for further block polymerization of the polystyrene product in which the initial polymerization reaction is permitted to proceed with the addition of monomers which can be polymerized anionically with the initial polystyrene product.

DESCRIPTION OF THE SPECIFIC EMBODIMENTS

Slurry polymerization

The styrene monomer that is polymerized in accordance with the process of this invention is a non-polar styrene which can have methyl substituents. Styrenes having polar groups such as chloride substituents cannot be used in this anionic catalyzed process. The styrene monomers contemplated include styrene, p-methylstyrene and alpha-methylstyrene. It is contemplated to use two or more monomers to produce copolymers as well as the use of a single monomer.

The anionic catalysts used are basically of two types. One type is a mono-initiator such as butyl lithium; sec-butyl lithium, t-butyl lithium, amyl lithium, and ethyl lithium. Another type of initiator is the so-called di-initiator such as the lithium or sodium salts of alpha methyl styrene or 1,1-diphenylethylene. The range of concentration of the initiator based upon the amount of styrene reactant is $10^{-1}$ to $10^{-4}$ moles of initiator/100 g. of styrene.

The slurrying medium used in the present process is a non-solvent for the styrene polymer. In general the slurrying medium is a paraffinic or monoolefinic hydrocarbon having between about 4 and about 7 carbon atoms, which can be normal or branched. Aromatic hydrocarbons are not utilizable nor are other polar solvents. Typical slurrying media include butane, pentane, isopentane, hexane, heptane, 2,2-dimethylbutane, butene, pentene, as well as mixtures such as petroleum ether, pentane-pentene, hexane-hexene. The polymerization process of the invention is carried out at temperatures between about 30° C. and about 100° C. The desired polymerization temperature is determined in part by the reflux temperature of the slurry medium. It is, however, within the contemplation of this invention to using pressure in order to elevate the reflux temperature of the slurrying medium.

An additional advantage is obtained in the present process when the slurrying medium is relatively volatile such as butane, pentane, isopentane, hexane, or petroleum ether. In this case, slurrying medium is absorbed into the polymer product thus producing a foamable product.

The suspending agent used to maintain the polymer in suspension as it is formed is a non-rubbery AB or ABA block polymer. In the block polymer suspending agent segment A is derived from styrene in amounts of 10 to 80 weight percent styrene based upon the total block polymer. Segment B is an alkyl styrene, such as t-butylstyrene, whose polymer has a glass transition greater than 50° C. The amount of suspending agent used is between about 0.1 and about 1.0 weight percent of the styrene reactant. The optimum amounts depends upon the particular block polymer structure used.

A block polymer dispersant that has been found to be particularly effective is a block polymer of styrene and t-butylstyrene. It is effective when the block polymer contains 10 to 80 weight percent styrene. This block polymer is particularly advantageous over the rubbery dispersants of the prior art in that very low concentration levels are effective. In addition, the new dispersants should not lower the softening temperature of the polystyrene or contribute to oxidative degradation, as might be the case of the diene block polymers. The following example illustrates a block polymer of this type.

EXAMPLES 8–16

As described in Example 7, other styrene polymerization runs were carried out using the various dispersants of Table I, as set forth in parentheses in Table II. Table II sets forth pertinent data and results of Examples 7–16.

TABLE II

| Example | Styrene, gms. | Dispersant (Table I), gms. | Initiator, mmole | Medium, ml. | Polymerization conditions | | Yield, percent | $\bar{M}_n \times 10^{-3}$, gms./mole | $\bar{M}_w / \bar{M}_n$ |
|---|---|---|---|---|---|---|---|---|---|
| | | | | | Time, min. | Temp., °C. | | | |
| 7 | 10 | .02 (1) | 0.25 | 50 | 15 | 68 | 95 | | |
| 8 | 10 | .01 (6) | 0.25 | 50 | 15 | 68 | 95 | | |
| 9 | 10 | .01 (5) | 0.25 | 50 | 15 | 68 | 95 | | |
| 10 | 10 | 0.1 (2) | 0.25 | 100 | 15 | 68 | | | |
| 11 | 10 | 0.1 (3) | 0.25 | 100 | 15 | 68 | | | |
| 12 | 10 | 0.1 (4) | 0.25 | 50 | 6 | 68 | 87 | 25.7 | 1.3 |
| 13 | 20 | 0.1 (4) | 0.25 | 50 | 6 | 68 | 97 | | |
| 14 | 10 | 0.1 (4) | 0.25 | 50 | 0.25 | 98 | 25 | 14.5 | 1.3 |
| 15 | 10 | 0.1 (4) | 0.15 | 50 | 6 | 68 | 73 | | |
| 16 | 10 | .08 (5) | 0.10 | 50 | 30 | 68 | ~100 | 86.5 | 1.4 |

EXAMPLE 1

In a reaction vessel equipped with a reflux condenser and agitation means were added 21 ml. of t-butylstyrene and 375 ml. of benzene. The solution was degassed by the application of a vacuum, followed by replacement with nitrogen. This step was repeated several times to insure proper degassing. A slight stream of nitrogen was continued throughout the ensueing polymerization reaction. A quantity of 1.9 ml. of 0.5 M sec-butyl lithium was added to initiate the reaction and the temperature was raised to 75° C. The polymerization was continued for 45 minutes. At this time 64 ml. of purified styrene monomer was added to the reactor and polymerization was allowed to proceed for an additional 30 minutes. The block polymer was separated from solution by precipitation in methanol. The reaction produced 74 grams of a block polymer containing 75 percent styrene by weight. Molecular weight data for this block polymer are set forth in Table I.

EXAMPLES 2–6

Using the procedure of Example 1, other t-butylstyrene-styrene block polymers were prepared and molecular weight data were obtained. Pertinent data are set forth in Table I.

TABLE I

| Example | Percent t-butyl-styrene | Percent styrene | $\bar{M}_s \times 10^{-3}$ (gms./mole) |
|---|---|---|---|
| 1 | 25 | 75 | 80 |
| 2 | 90 | 10 | 98 |
| 3 | 85 | 15 | 98 |
| 4 | 80 | 20 | 98 |
| 5 | 75 | 25 | 80 |
| 6 | 50 | 50 | 80 |

The following examples demonstrate the polymerization process of this invention.

EXAMPLE 7

A quantity of 0.01 gram of the block polymer of Example 1 was dissolved in 10 gm. of styrene monomer under nitrogen atmosphere and 50 ml. of hexane was added. The block polymer precipitated into a stable emulsion. The hexane was then brought to its reflux temperature (68° C.) and 0.25 m. mole sec-butyl lithium was added. The solution went to a red color immediately and a slight rise in the reflux temperature was noted due to the polymerization exotherm. The heat of polymerization was dissipated through the refluxing solvent. In about 12–15 seconds from the time of initiation, the "living" polystyrene precipitated from the hexane into a finely divided stable slurry. At the end of about 15 minutes, a few drops of methanol was added to terminate the polymerization. The red color of the polymer was immediately discharged. The slurry was then filtered, dried and weighed. About 95% conversion of monomer to polymer was achieved.

Physical data were obtained to compare the polystyrene of Example 16 with a typical commercial polystyrene made by conventional means. The data are given in Table III. Comparison is noted to be favorable.

TABLE III

| | Example 16 | Commercial |
|---|---|---|
| Tensile modulus, p.s.i. | 317,000 | 332,000 |
| Yield strength, p.s.i. | None | None |
| Break strength, p.s.i. | 6,300 | 8,500 |
| Elongation, percent | 5 | 5 |
| RSV | 0.49 | .84 |
| Impact strength (ft. lbs./in. notch) | 0.26 | 0.44 |
| Vicat, °C | 104 | 104 |
| Melt index | 20.4 | 3.1 |
| $M_w$ | 124,000 | 226,000 |
| $M_n$ | 86,500 | 73,000 |
| $M_w/M_n$ | 1.44 | 2.7 |
| Residual styrene, percent | 0.03 | 0.06 |

BLOCK POLYMERS FROM SLURRY POLYMERIZATION

The polystyrene product from the aforedescribed slurry polymerization process contains active anionic ends and can be utilized to produce block polymers. In this modification or embodiment of the present invention, the initial slurry polymerization is not terminated, as by adding methanol and polymerization is continued by addition of other monomers which will undergo anionic catalyzed polymerization.

Such additional monomers which can be polymerized anionically are known in the art and include, for example, 2-vinylpyridine, 4-vinylpyridine, ethylene oxide, methacrylonitrile, acrylonitrile, isoprene, butadiene, dimethylbutadiene, vinyl naphthalene, and vinyl biphenyl.

In carrying out this block polymerization modification of the primary slurry processes, the slurry polymerization is merely continued without stopping the polymerization reaction. Accordingly, the conditions utilized in the block slurry polymerization process will be those used in the initial slurry polymerization process.

EXAMPLE 17

A slurry polymerization of styrene was carried out as described in Example 1, except that polymerization was not terminated after 10 minutes by the addition of methanol. To the polystyrene slurry was added 2 g. of purified 2-vinylpyridine and the reaction was allowed to proceed under reflux for an additional 30 minutes. At the end of this time a few drops of methanol was added to terminate the polymerization. The brownish-red color of the vinylpyridine anion was immediately discharged. The slurry was then filtered and dried. Conversion was substantially quantitative. Elemental analysis of the block polymer gave 90.31% C, 7.58% H, and 2.18% N (calculated 90.29% C, 7.52% H, and 2.19% N).

EXAMPLE 18

Ethylene oxide was blocked onto the "active" polystyrene slurry (as in Example 17) by bubbling ethylene oxide gas into the slurry for a period of 60 minutes at 68° C. The red color of the "active" slurry was immediately discharged on addition of the ethylene oxide. At the end of this time period the gas flow was stopped, and the polymer slurry collected and dried into a free flowing powder.

EXAMPLE 19

To 10 gms. of an "active" slurry (as in Example 17) was added 0.25 gms. of N,N-diethylacrylamide. The red color of the "active" slurry was discharged to the colorless anion of the acrylamide. After a period of 10 min. at 68° C., the reaction was terminated with the addition of a few drops of acetic acid. The polymer was collected and dried. Infrared analyses of the polymer showed the presence of a strong carbonyl peak attributable to the N,N-diethylacrylamide.

EXAMPLE 20

A quantity of 1.4 gms. of isoprene was added to 10 gms. of an "active" polystyrene slurry (as in Example 17) at room temperature. The red color of the slurry changed to the yellow-green color of the isoprenyl anion. The polymerization was continued for 3 hours at this temperature under nitrogen. A drop of methanol was used to terminate the reaction and the polymer filtered and dried. A fine, free flowing slurry was maintained during the polymerization of the isoprene.

EXAMPLE 21

The process described in Example 17 was repeated except that 3 g. acrylonitrile was used in place of 2-vinylpyridine as a blocking monomer. The acrylonitrile graft beads were foamed by heating and then hydrolyzed forming polyelectrolyte foamed beads.

The polyelectrolyte foamed beads such as obtained in Example 21 can be used as soil conditioners for modifying impervious clay soils to break up the gel structure and to improve their workability and crop growing capability. These products have other potential uses such as drilling mud additives, ion exchange polyelectrolytes, evaporation retardants and oil spill cleanup materials. Even when not foamed, the block polymers described herein impart properties of greater dye receptivity to the styrene polymer.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. In a slurry process for the polymerization of styrene, p-methylstyrene, or alpha-methylstyrene, that comprises adding, to a paraffinic or monoolefinic hydrocarbon slurrying medium, said styrene, p-methylstyrene, or alpha-methylstyrene, a dispersant, and an anionic catalyst initiator, and carrying out polymerization at about 30°–100° C.; the improvement wherein said dispersant is an AB or ABA block polymer containing 10 to 80 weight percent styrene, wherein the A monomer is styrene and the B monomer is an alkyl substituted styrene whose polymer has a glass transition temperature greater than 50° C.

2. The process of claim 1, wherein said styrene monomer is styrene.

3. The process of claim 2, wherein said paraffinic hydrocarbon slurrying medium is hexane.

4. The process of claim 3, wherein said block polymer dispersant is a block polymer of styrene and t-butylstyrene.

5. The process of claim 1, further characterized in that the slurry polymerization is continued with another monomer polymerizable by an anionic catalyst initiator to produce a block polymer.

6. The process of claim 4, further characterized in that the slurry polymerization is continued with another monomer polymerizable by an anionic catalyst initiator to produce a block polymer.

7. The process of claim 6, wherein said another monomer is 2-vinylpyridine.

8. The process of claim 6, wherein said another monomer is N,N-diethylacrylamide.

9. The process of claim 6, wherein said another monomer is isoprene.

10. The process of claim 6, wherein said another monomer is acrylonitrile.

References Cited
UNITED STATES PATENTS

| | | | |
|---|---|---|---|
| 3,137,682 | 6/1964 | Corson et al. | 260—88.2 |
| 3,257,340 | 6/1966 | Osmond et al. | 260—4 |
| 3,402,160 | 9/1968 | Hayes | 260—93.5 |
| 3,459,832 | 8/1969 | Kern | 260—881 |

JOSEPH L. SCHOFER, Primary Examiner

S. M. LEVIN, Assistant Examiner

U.S. Cl. X.R.

260—2.1 R, 879, 881, 882, 886